United States Patent [19]

Doi et al.

[11] E Re. 28,693

[45] Reissued Jan. 20, 1976

[54] IMAGE TRANSFER RECORDING APPARATUS WITH RESIN COATED DRUM

[75] Inventors: Tetsuo Doi; Shoji Sagae, both of Hitachi, Japan

[73] Assignee: Hiatchi, Ltd., Japan

[22] Filed: May 9, 1974

[21] Appl. No.: 468,600

Related U.S. Patent Documents

Reissue of:

[64] Patent No.: 3,662,395
Issued: May 9, 1972
Appl. No.: 9,176
Filed: Feb. 6, 1970

[30] Foreign Application Priority Data

Feb. 7, 1969 Japan ..... 44-8738
Nov. 7, 1969 Japan ..... 44-88757

[52] U.S. Cl. ..... 346/74 ES; 117/37 LE; 260/78 TF
[51] Int. Cl.[2] ..... G01D 15/06; G03G 15/16
[58] Field of Search ..... 346/74 ES, 74 S, 74 SB, 346/74 P, 74 EX, 74 EK; 117/17.5, 37 LE; 118/637; 355/4; 260/78 TF, 77.5 R

[56] References Cited

UNITED STATES PATENTS

| | | | |
|---|---|---|---|
| 2,624,652 | 1/1953 | Carlson | 346/74 ES |
| 2,986,466 | 5/1961 | Kaprelian | 355/4 |
| 3,257,222 | 6/1966 | Carlson | 346/74 ES |
| 3,419,884 | 12/1968 | Betts | 346/74 ES |
| 3,430,254 | 2/1969 | Schwertz | 346/74 ES |
| 3,519,253 | 7/1970 | Aser et al. | 117/17.5 |
| 3,592,642 | 7/1971 | Kaupp | 118/637 |
| 3,639,342 | 2/1972 | Miyadera | 260/78 TF |
| 3,643,629 | 2/1972 | Kangas | 118/637 |
| 3,790,530 | 2/1974 | Koerner | 260/77.5 R |

OTHER PUBLICATIONS

Medley, H. C. Development of Electrostatic Images, IBM Tech. Dics. Bull. Vol. 2, No. 2, 8/59, pp. 4, 5.

*Primary Examiner*—Bernard Konick
*Assistant Examiner*—Jay P. Lucas
*Attorney, Agent, or Firm*—Craig & Antonelli

[57] ABSTRACT

An image transfer recording apparatus in which a recording drum on which an information signal is recorded by electrostatic recording means is provided with a surface layer of electrically insulating resin so that a powdery developer attaching to the electrostatic latent image formed on the surface of the recording drum can be completely transferred onto a recording sheet thereby to obtain a recorded image of good resolution.

9 Claims, 17 Drawing Figures

INVENTORS

TETSUO DOI and SHOJI SAGAE

BY Craig, Antonelli, Stewart & Hill
ATTORNEYS

INVENTORS

TETSUO DOI and SHOJI SAGAE

BY Craig, Antonelli, Stewart & Hill
ATTORNEYS

INVENTORS

TETSUO DOI and SHOJI SAGAE

BY Craig, Antonelli, Stewart & Hill
ATTORNEYS

INVENTORS

TETSUO DOI and SHOJI SAGAE

BY Craig, Antonelli, Stewart & Hill
ATTORNEYS

INVENTORS

TETSUO DOI and SHOJI SAGAE

BY Craig, Antonelli, Stewart & Hill
ATTORNEYS

IMAGE TRANSFER RECORDING APPARATUS WITH RESIN COATED DRUM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to recording apparatus such as copying apparatus and facsimiles, and more particularly to an inexpensive and simple recording and apparatus capabale of recording an image on a sheet of plain paper without using a special recording sheet such as, for example, a copying sheet treated with a photoconductive material such as zinc oxide.

2. Description of the Prior Art

Prior art recording apparatus of this kind employed a wide variety of methods which had their respective merits and demerits.

In one type of such facsimile apparatus, a recording method of this kind utilizing the breakdown due to an electric discharge has been in use for quite a long time, which method includes providing a white surface coating on a carbon black layer and electrically destroying the white surface layer to obtain a record. This electric discharge recording method has been defective in that it requires a special recording sheet which is quite expensive, gives off fumes that are accompanied by bad odors which are produced from the recording sheet during recording and products of the breakdown due to the discharge tend to become attached to the recording stylus.

Another type of facsimile apparatus employs a method of the kind in which a color is produced by electrolysis. According to this electrolytic recording method, a material which develops a color when subjected to electrolysis is coated on a recording sheet and a signal voltage is applied to the recording sheet through a recording stylus so that a colored record can be obtained by the electrolytic reaction which takes place at the portions applied with the voltage. The electrolytic recording method has been defective in that a special expensive material must be coated on a recording sheet and, since it includes a wet process, a record of high density and resolution cannot be obtained owing to the blurring of the recorded image. The electrolytic recording method has further been defective in that a special expensive material must be coated on a recording sheet and, since it includes a wet process, a record of high density and resolution cannot be obtained owing to the blurring of the recorded image. The electrolytic recording method has further been defective in that the record obtained tends to undergo a change due to aging since the color is produced by a chemical change, and the recording sheet tends to be chemically affected by other sheets during the storage thereof with the result that the recorded image is also subject to a change.

An electrostatic recording method has been advantageous over these methods in that a record can be reproduced on a recording sheet by relatively simple means and an improvement in the picture quality can be expected. However, the electrostatic recording method has been disadvantageous in that not only a special expensive recording sheet called an electrostatic recording sheet is required, but also an extra process of developing and fixing after making the recording is required compared with the above-mentioned recording method which utilizes the breakdown of an electric discharge, or color production by electrolysis, and the requirement for these extra process leads to complex apparatuses.

Other methods employed heretofore include converting a signal into mechanical vibrations and striking a recording sheet through carbon paper by means actuated by mechanical vibrations thereby to obtain a record, or using a special recording sheet (a pressure-sensitive sheet) which produces a color in response to pressure. These methods have however been defective in their poor frequency response and in the trouble of requiring such a special sheet.

Silver salt photography is another recording method employed heretofore in the art. This method has however been unfit for practical use except for applications to very special purposes where a high recording performance is required, because the recording material itself is very expensive. Materials employed in copying apparatus and the like will now be discussed. Electrofax is an optical recording method which employs a recording sheet prepared by coating a mixture of a photoconductor such as zinc oxide and a special resin binder on a sheet of paper. Thus, this method also requires a specially processed recording sheet. Further, there is a recording method employing a heat-sensitive recording sheet which is expensive and specially processed. Thus, the problem of expensiveness of the recording sheet is still left unsolved in these methods.

Diazo-type copying apparatus is one typical example of copying apparatus of simple construction using a relatively inexpensive recording sheet. In spite of the fact that this apparatus is very favorable for the reproduction of an original in sheet form by exposure to transmitted light, it has been defective in that its application is limited due to the inability to carry out the reflection copying of articles, such as books and the reproduced record cannot be preserved for an extended period of time due to discoloration or disappearance of the image since a chemical material is used.

Xerography is an inexpensive and favored method in the point that a highly accurately reproduced record can be obtained in spite of the use of a sheet of plain paper. However, this method has had the disadvantge that the plate or drum of photoconductive selenium used therein is quite costly and mechanically brittle and therefore extreme care must be taken in the handling thereof. Further, for the successful electrostatic transfer printing of a toner image onto a sheet of plain paper, very complex handling and expensive means have been required since the remaining toner image must be swept off by means such as a soft brush or a vacuum sweeper to prepare for the next copying cycle.

SUMMARY OF THE INVENTION

With the above defects in mind, it is an object of the present invention to provide a novel and simple recording apparatus.

Another object of the present invention is to provide an apparatus including electrostatic recording means responsive to an information signal for forming a latent image in the form of an electrical charge on a recording drum having on the surface thereof a layer of electrically insulating resin of a highly non-wetting and non-adhesive nature, developing means for transforming the latent image into a toner image, and means for transfer printing the toner powder image formed on the recording drum onto a heated recording sheet and, at the same time, heating the toner to fix the image.

A further object of the present invention is to provide an apparatus including developing means for transforming a latent image formed on a recording drum into a toner image, and means for applying an electrostatic force which is greater than the electrostatic force existing between the toner image and the recording drum to the back face of a recording sheet engaging the surface of the recording drum so as thereby to facilitate and improve the transfer printing of the toner image onto the recording sheet.

A still further object of the present invention is to provide an apparatus including developing means for transforming a latent image formed on a resin layer on the surface of a recording drum into a toner image, means for transfer printing of the toner image formed on the surface of the recording drum onto a recording sheet to obtain a recorded image, and means for sweeping off the electrical charge of the latent image on the recording drum and of the toner remaining on the surface of the recording drum without being transferred after the step of transfer printing so as to thereby prevent any undesirable disturbance to a succeeding record and to ensure a good picture quality for an extended period of time.

A yet further object of the present invention is to provide an apparatus including a magnet drum disposed within a developing unit for supplying a toner to a recording drum, a sweeping plate disposed to engage the magnet drum with a portion thereof for controlling the amount of the toner supplied to the recording drum, and means for rotating the magnet drum in normal and reverse directions for selectively supplying the toner to the recording drum.

Another object of the present invention is to provide an apparatus including a plurality of sets of means for electrostatically recording an image on a recording drum and means for developing the image, said sets being arranged side by side by the number corresponding to the number of required primary colors so as thereby to obtain a multi-color print by a single operation.

DESCRIPTION OF THE PREFERRED EMBODIMENTS

Figure 1:
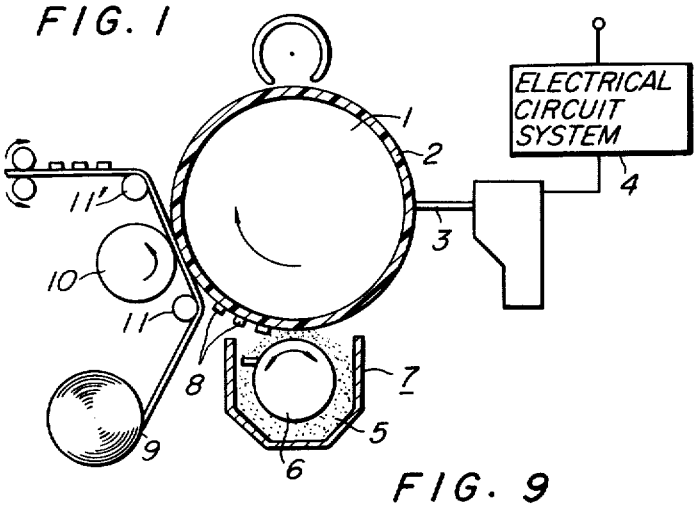
FIG. 1 is a schematic view of a system for transfer printing of an image using heat.

Referring to FIG. 1 showing the basic principle of a system for the transfer printing of an image under heat, a recording drum 1 is arranged to be rotated by an external drive source. The recording drum 1 is a drum member of a conductive metal and is provided on its surface with a layer 2 of electrically insulating resin of a heat-resistive nature having a low adhesion. Information in the form of a recording signal such as a facsimile signal is supplied to an electrical circuit system 4, and a recording stylus 3 disposed in close proximity to or engaging the surface of the recording drum 1 is actuated in response to an output from the electrical circuit system 4 to form a latent image of an electrical charge on the insulating resin layer 2 depending on the information. A powdery developer 5 attracted onto a magnetic drum 6 in a developing unit 7 is transferred to the recording drum 1 to develop the charge image (latent image) thereby to provide an image (visible image) 8 formed of powders. The powder image 8 is transfer printed onto a recording sheet 9 which is moved in contact with the recording drum 1 by another driving mechanism. The recording sheet 9 is moved in one direction in rolling contact with the recording drum 1 while being pressed against a heating drum 10 and guided by guide rollers 11 and 11'. Since the resin layer 2 covering the recording drum 1 carrying the powder image 8 is formed from an electrical insulator having a low adhesion, the toner forming the powder image 8 is easily transferred onto the recording sheet 9 and the transferred image is fused by the heat of the heating drum 10 to be permanently fixed on the recording sheet 9.

The specifications required for the recording drum 1 are shown in Table 1 and the properties of preferred materials for forming the resin layer 2 coated on the recording drum 1 are shown in Table 2.

Table 1

| Classification | Items | Specifications | Remarks |
|---|---|---|---|
| Electrical properties | Breakdown voltage | Not less than 1KV | Recording voltage: 500–600 V. |
| | Volume resistivity | More than $10^{14}\Omega$cm | Static recording sheet: $7–9\times10^{14}\Omega$cm |
| | Surface resistivity | More than $10^{14}\Omega$ | Static recording sheet: $6–10\times10^{14}\Omega$ |
| | Dielectric constant | The higher, the better | Commonly 2–3 in plastics |
| Properties of film | Pinhole | No pinholes are allowed | |
| | Thickness | 15–20 ±10% | Static recording sheet:about 6μ. |
| | Surface smoothness | Mirror surface | |
| | Coatability | Coatable on metallic drum | Present drum material:stainless steel. |
| Physical properties | Non-adhesiveness | The greater the better | Fused toner must not become attached to the resin layer. |
| | Resistance to heat | Toner's melting point + 50–80° C | Toner's melting point:about 100° C. |
| | Resistance to wear | Tungsten wire 0.2ϕ, stylus pressure 2–3 g | Should endure 100,000 frictional contacts. |
| Chemical properties | Resistance to toner | Should not be corroded by thermoplastic resin in toner. | |
| | Resistance to corona | Should endure 500,000-second (140-hour) continuous tests under eraser electrode (about 100,000 recordings). | |

TABLE 2

| Items | Tetra-fluoro-ethylene | Fluoro-ethylene propylene | Taflum (Alumite surface impreg-nated with Teflon) | Vinyl-idene fluoride | Poly-amide imide | Poly-ethylene tereph-thalate | Remarks |
|---|---|---|---|---|---|---|---|
| Breakdown voltage | O | O | X | O | O | O | Electrical properties |
| Insulation resistance | O | O | X | X | O | O | |
| Pinhole | X | O | X | O | O | O | |
| Uniform film thickness | O | X | O | Δ | O | O | Properties of film |
| Surface smoothness | O | X | O | X | O | O | |
| Coatability | O | O | O | O | O | X | |
| Nonadhesiveness | O | O | O | Δ | Δ | Δ | Physical properties |
| Resistance to heat | O | O | O | Δ | O | Δ | |

In Table 2, the symbols employed are defined as follows: O - sufficiently satisfactory for achieving the object of this invention. Δ - somewhat satisfactory for achieving the objects of the present invention. X - quite unsatisfactory for achieving the objects of the present invention.

It will be known from the above tables that, in spite of the fact that fluorocarbon resins are ideal materials in respect of the requirements for the resistance to heat and non-adhesiveness, tetrafluoroethylene and fluoroethylene propylene are not safisfactory for properties of the film, while taflum (cf. Table 2) is not satisfactory in its electrical properties as well as the other physical properties of the film. It is therefore desirable to solve these faults of the fluorocarbon resin materials.

On the other hand, polyamide imide is slightly inferior to the fluorocarbon resins in the non-adhesiveness regarding physical properties, but is substantially satisfies the specifications in regard to other requirements. Thus, polyamide imide can be freely used in practical applications provided that the attachment of the fused toner can be effectively prevented.

There is a very great possibility that resin materials satisfying the above requirements can be developed in the near future and the problems incountered in respect of the material will soon be solved.

Figure 2:
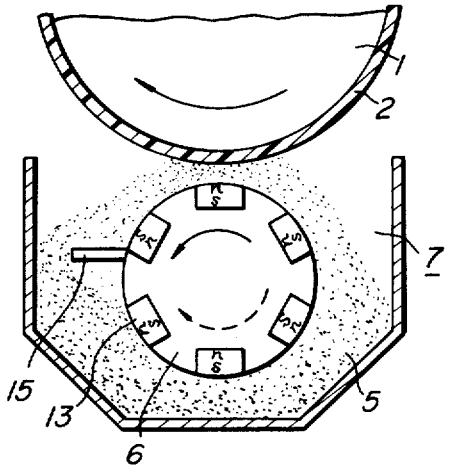
FIG. 2 is an enlarged sectional view of parts of the developing unit in the system shown in FIG. 1.

Referring to FIG. 2 schematically showing the structure of the developing unit 7 for supplying the powdery toner developer 5 to the resin layer 2 covering the recording drum 1, the developing unit 7 comprises a casing within which the magnet drum 6 and a mass of the powdery developer 5 are contained. The magnet drum 6 is adapted for normal and reverse rotation by being driven by another drive source (not shown) and is composed of a support 14 and a plurality of rubber magnets 13 having the same axial length as the support 14 and embedded radially in the outer peripheral portion of the support 14. The powdery developer 5 consists of a toner and a carrier for the toner. A sweeping plate 15 is disposed in such a fashion that one end thereof engages the surface of the magnet drum 6.

With a structure as described above, it is desirable that the powdery developer 5 in the developing unit 7 is restrained from contact with the recording drum 1 until the recording of a latent image on the recording drum 1 is completed. Thus, during the normal or counterclockwise rotation, for example, of the magnet drum 6, the powdery developer 5 including the carrier attaches to the magnet drum 6 so that the toner attaches to the recording drum 1 to carry out the developing operation, while during the recording of a latent image on the recording drum 1, the magnet drum 6 is rotated in the reverse or clockwise direction and the sweeping plate 15 engaging at one end thereof with the magnet drum 6 interrupts the supply of the powdery developer 5 to the recording drum 1 so that the toner cannot be supplied to the recording drum 1 until the recording of the latent image is completed. It will thus be seen that the supply of the toner to the surface of the recording drum 1 can be selectively controlled depending on the rotating direction of the magnet drum 6 and by the action of the cooperating sweeping plate 15.

Figure 3:
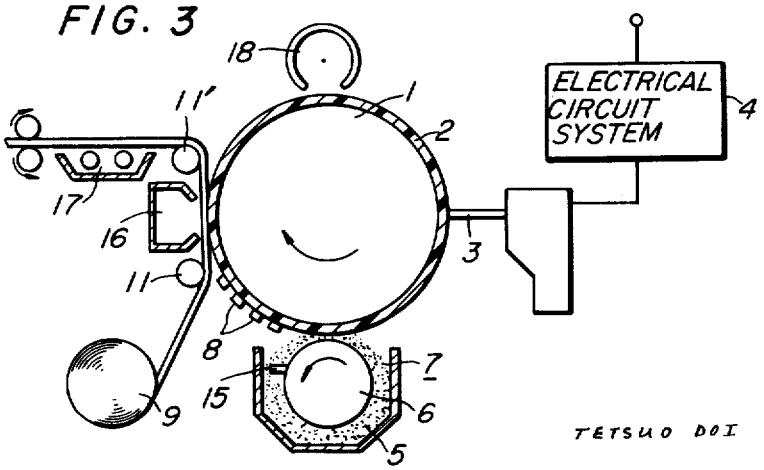
FIG. 3 is a schematic view of an electrostatic transfer printing system.

FIG. 3 shows schematically the basic principle of an electrostatic transfer printing system in another embodiment of the present invention.

Referring to FIG. 3 wherein like reference numerals are used to denote like parts appearing in FIGS. 1 and 2, a recording drum 1 is provided on its surface with a layer 2 of electrically insulating resin having no pinholes. One end of a recording stylus 3 is disposed in close proximity to or with engages the recording drum 1 and an information signal is transmitted to the recording stylus 3 via an electrical circuit system 4. A powdery developer 5 is contained within a developing unit 7 so that it can be selectively supplied to the recording drum 1 through the medium of a magnet drum 6. A recording sheet 9 is brought into rolling contact with the recording drum 1 by being guided by guide rollers 11 and 11' so that a powder image 8 formed on the surface of the recording drum 1 by the developing unit 7 can be transfer printed onto the recording sheet 9 to provide a permanently visible image. An electrostatic charger 16 of polarity opposite to the polarity of the toner and producing an electrostatic force greater than the electrostatic force between the toner in the powdery developer 5 and the recording drum 1 is disposed adjacent to the back face of the recording sheet 9 at a position at which the recording sheet 9 engages the recording drum 1. A heater 17 is provided to apply heat to the toner electrostatically transferred onto the recording sheet 9. A residual charge eraser 18 is disposed adjacent to the recording drum 1 to erase the residual charge on the recording drum 1 so that the residual charge may not adversely affect the next recording by the recording stylus 3. The charge eraser 18 is of the corona discharge type. The residual charge eraser 18 is available in two types depending on the type of discharge, that is, the A.C. discharge type which produces an A.C. corona discharge for erasing the residual charge and the D.C. discharge type which produces a D.C. corona discharge having a polarity opposite to the polarity of the charge on the recording drum 1 for neutralizing the recording drum 1.

With a structure as above described, the electrical circuit system 4 is operative in response to transmission of an information signal thereto to apply a signal voltage corresponding to the information signal to the recording stylus 3 and the information is recorded on the resin layer 2 on the recording drum 1 as a latent image. During the recording of the latent image, the magnet drum 6 disposed within the developing unit 7 is rotated clockwise by another drive source (not shown) and thus the toner does not become attached to the recording drum 1. Upon completion of the recording of the latent image of the information signal onto the recording drum 1, the magnet drum 6 is driven in the counterclockwise direction to supply the powdery developer 5 to the surface of the recording drum 1 carrying the latent image so that the toner attached to that surface to form a powder image 8.

When the recording sheet 9 driven by another driving source is fed to make rolling contact with the recording drum 1 carrying the powder image 8, the powder image 8 is transfer printed onto the recording sheet 9, since the electrostatic charger 16 applies to the recording sheet 9 an electrostatic force which is greater than the electrostatic force between the latent image and the recording drum 1. The toner transferred to the recording sheet 9 is then heated by the heater 17 to be fused so that it is firmly attached to the recording sheet 9. The residual charge eraser 18 removes the charge carried by the toner remaining on the recording drum 1 without being transferred to the recording sheet 9 and erases or neutralizes the residual charge on the resin layer 2 covering the surface of the recording drum 1, thereby eliminating any adverse effect on the next recording operation.

The need for cleaning is unnecessary by virtue of the provision of the residual charge eraser 18 which will be described with reference to FIGS. 7 and 8.

Figure 7A:
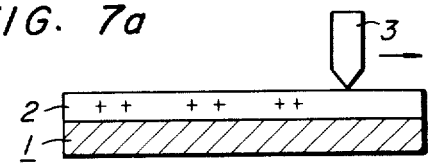
FIGS. 7a–7e and 8a–8e are explanatory views showing the successive steps of a cleaning-less method according to the present invention.
Figure 7B:
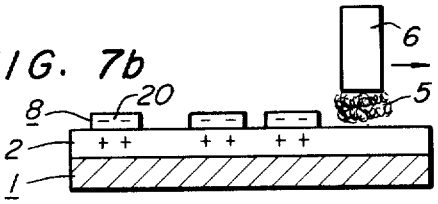

As shown in FIG. 7a, a signal voltage is applied through the recording stylus 3 to the recording drum 1, which is made from a conductive material having a small insulation resistance and is provided on its surface with the layer 2 of a non-adhesive and highly heat-resistive resin, and thus a laten image (shown by + in FIG. 7a) corresponding to the signal is formed on the recording drum 1. Then, as shown in FIG. 7b, the magnet drum 6 carrying thereon the powdery developer 5 which is a mixture of a carrier such as iron powder and a toner makes friction contact with the surface of the recording drum 1 carrying the latent image theeon. As a result, the toner 20 of the polarity opposite to the polarity of the latent image attached to the recording drum 1 to form a visible image (powder image) 8 in the manner described above.

Figure 7C:
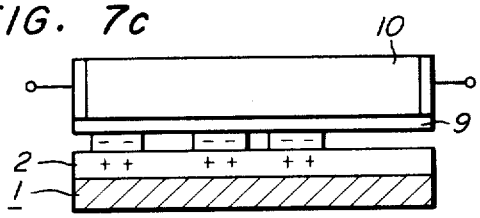
Figure 7D:
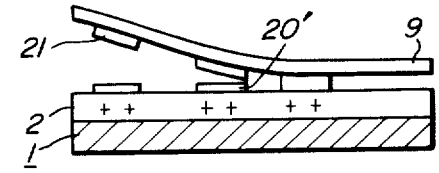
Figure 7E:
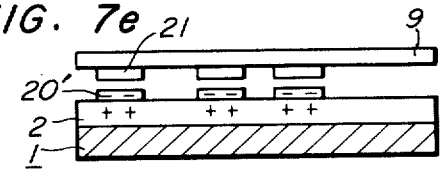

In FIG. 7c showing the step of transfer printing under heat, the recording sheet 9 heated by the heating drum 10 is brought into rolling contact with the recording drum 1 carrying the powder image 8 thereon. Since the recording drum 1 having the toner 20 attached thereto is provided on its surface with the non-wetting, non-adhesive, a highly heat-resistive and electrically insulating resin layer 2, the toner 20 forming the powder image 8 is easily transferred onto the recording sheet 9 heated by the heating drum 10 and is fused to become firmly attached to the recording sheet 9. Then, when the recording sheet 9 is pulled away from contact with the recording drum 1, the information is transfer printed onto the recording sheet 9 to provide a permanent image 21 as shown in FIG. 7d.

The recording is carried out in this manner. When, however, the temperature of the heating drum 10 is too high and the recording sheet 9 is kept pressed against the recording drum 1 for a length of time far greater than is required, a portion of the toner may adhere to the recording drum 1 as shown by 20' in FIG. 7e. When, on the other hand, the temperature of the heating drum 10 is to low and the recording sheet 9 is pressed against the recording drum 1 for a length of time far less than is required, the toner 20 would not be substantially transferred to the recording sheet 9 and the greater portion of the toner 20 may remain on the recording drum 1. In both of these cases, not only the quality of the image (permanent image 21) to be recorded is extremely degraded, but also the toner portion 20' which is firmly attached to or that remains on the surface of the recording drum 1 affects adversely the suceeding recording operation and the formation of a latent image so that satisfactory recording cannot be carried out.

In the common xerography system, therefore, means such as a soft brush of wool is employed to forcedly remove the toner portion 20' remaining on the recording drum 1. However this requires a very complex mechanism and yet the toner portion 20' cannot be easily removed. Further, due to the fact that the charge of the latent image still remains on the recording drum 1 even though the toner portion 20' remaining on the recording drum 1 is removed, the toner 20 may become attached to the previously formed latent image portion during the developing step in the next recording operation, thereby giving rise to a disturbance of the next image.

Figure 8A:
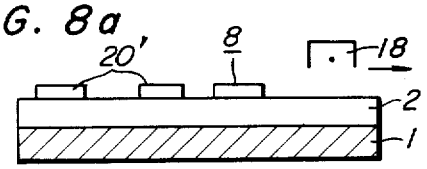
Figure 8B:
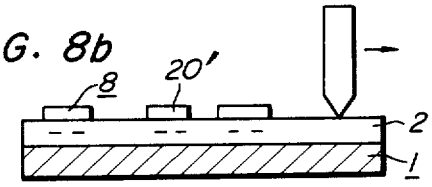

The above defects are overcome by the present invention in which the residual charge eraser 18 for erasing the charge stored on the latent image and the remaining toner portion 20' on the recording drum 1 or for charging them slightly in the opposite polarity is disposed opposite to the recording drum 1 and is arranged to move in a direction shown by the arrow in FIG. 8a while being applied with a suitable A.C. voltage or a D.C. voltage of the polarity opposite to that of the signal voltage. Thus, when the residual charge eraser 18 moves over the recording drum 1, the charge carried by the latent image and the toner portion 20' still remains on the recording drum 1 after the transfer printing is completely removed or the latent image and the toner portion 20' are slightly charged to a polarity opposite to the polarity of the signal voltage. In the next recording operation, information transmitted through the recording stylus 3 is formed as a latent image of charge on the recording drum 1 carrying the remaining toner portion 20' which is free from any charge as shown in FIG. 8b. Then, when the magnet drum 6 carrying thereon the powdery developer 5 which is a mixture of iron powder and the toner makes rubbing contact with the surface of the recording drum 1 as shown in FIG. 8c, the toner portion 20' is rubbed away from the recording drum 1 by the magnet drum 6 and the toner 20 in the powdery developer 5 is solely attached to the surface of the recording drum 1 carrying the latent image as the toner portion 20' is free from any charge.

Thus, the portion of the toner 20' which still remains after the developing step can be completely removed and a satisfactory recorded image can be obtained without any undesirable disturbance to the image by the preceding record. In the step of the transfer printing under heat as shown in FIG. 8d; the temperature of the heating drum 10 and the length of time of the pressure contact between the recording drum 1 and the recording sheet 9 may be suitably selected so as not to cause the firm attachment of the toner 20 to the recording drum 1. Thereafter, the recording sheet 9 is stripped off the recording drum 1 as shown in FIG. 8e. Any toner portion 20' remaining on the recording drum 1 does not adversely affect the nest record.

Figure 8C:
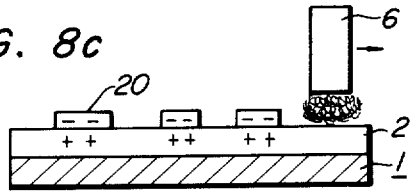
Figure 8D:
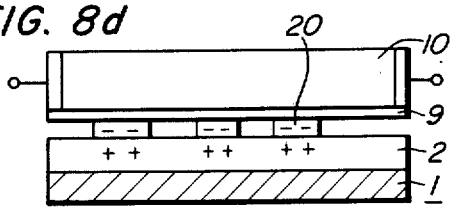
Figure 8E:
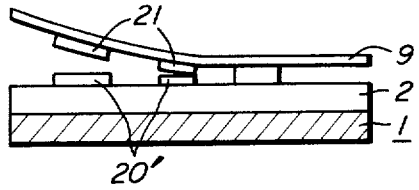

Although the charge carried by the latent image and the toner portion 20' on the recording drum 1 is removed by the residual charge eraser 18 in FIG. 8a, the charge may be removed prior to the transfer printing of the image onto the recording sheet 9, that is, immediately after the step shown in FIG. 8c so as to facilitate the transfer printing of the image onto the recording sheet 9. Further, although the above description has referred to the method of transfer printing under heat, it will be apparent that the same applies to the method of electrostatic transfer printing in which an electrostatic charge is applied to the recording sheet 9 for electrostatically transferring the toner 20 on the recording drum 1 onto the recording sheet 9.

A practical apparatus according to the present invention will be described with reference to FIGS. 4 through 6. The apparatus includes a base 101 having a pair of stands 102 and 103 upstanding from opposite end portions thereof. End plates 104 and 105 are firmly secured to the respective stands 102 and 103. As best shown in FIG. 6, a toner casing 106 contains therein a mass of a powdery developer 111, and a magnet drum 109 and a sweeping plate 110 are disposed within the toner casing 106. The magnet drum 109 is composed of a drum member 107 of brass or like material and a plurality of magnets 108 for rubbing, embedded in the outer peripheral portion of the drum member 107 and having an axial length equal to the length of the drum member 107. The shaft 112 of the magnet drum 109 carries a sprocket 113 at one end thereof, and a chain 114 engages the sprocket 113 to drivingly connect the shaft 112 with a motor 115. A recording drum 116 is covered on its surface with a layer 156 of resin material of the kind previously described. One end of the shaft 117 of the recording drum 116 is journaled in a bearing 118 and connected to a motor 120 through a coupling 119, while the other end of the shaft 117 is provided with a clutch 122 and is received in a bracket 121. A lead screw 123 for a scanner 125 carrying a recording stylus 124 is rotatably supported at one end thereof by the end plate 105 and at the other end by the end plate 104. A motor 126 drives the lead screw 123 through a gear train such that a gear 127 mounted on one end of the lead screw 123 meshes with a gear 128 and a gear 129 coaxial with the gear 128 meshes with a gear 130 mounted on the shaft of the motor 126. The scanner 125 is mounted on a slide rod 131 and a guide 132 so as to be slidable in the axial direction of the recording drum 126. One end of the slide rod 131 is connected to the end plate 104 through a spring 133 and a holder 134, while the other end of the slide rod 131 is connected to the end plate 105 through a connecting rod 135 and a rotary solenoid 136. A rope 137 is anchored at one end thereof to a hook 138 provided at the lower portion of the scanner 125 and at the other end to a spool 141 mounted on a spool shaft 140 through an idler 139.

A residual charge eraser 142 includes an electrode 143 which is supported by an electrical insulator 144 in such a manner that one end thereof is opposite to the recording drum 116. The electrical insulator 144 supporting the electrode 143 is covered by a metal cover 145. The charge eraser 142 is firmly secured at opposite ends to the end plates 104 and 105 through L-shaped members 146. An electrostatic charger 147 is disposed adjacent to the reverse side of a recording sheet 150 which makes rolling contact with the recording drum 116 by being guided by guide rollers 148 and 149. The electrostatic charger 147 includes a central discharge electrode 151 of piano wire of the like and a casing 153 securely fixed to a side plate 154. The casing 153 is provided with an opening 152 opposite to the recording drum 116.

The scanner 125 having the recording stylus 124 makes a sliding movement so that the recording stylus 124 contacts the recording drum 116 at the topmost portion of the latter. The recording stlyus 124 can swing through an angle $\theta$ by means of a holder 155 mounted on the slide rod 131 so that it can be moved a certain distance away from the surface of the recording drum 116 when not in use.

Figure 4:
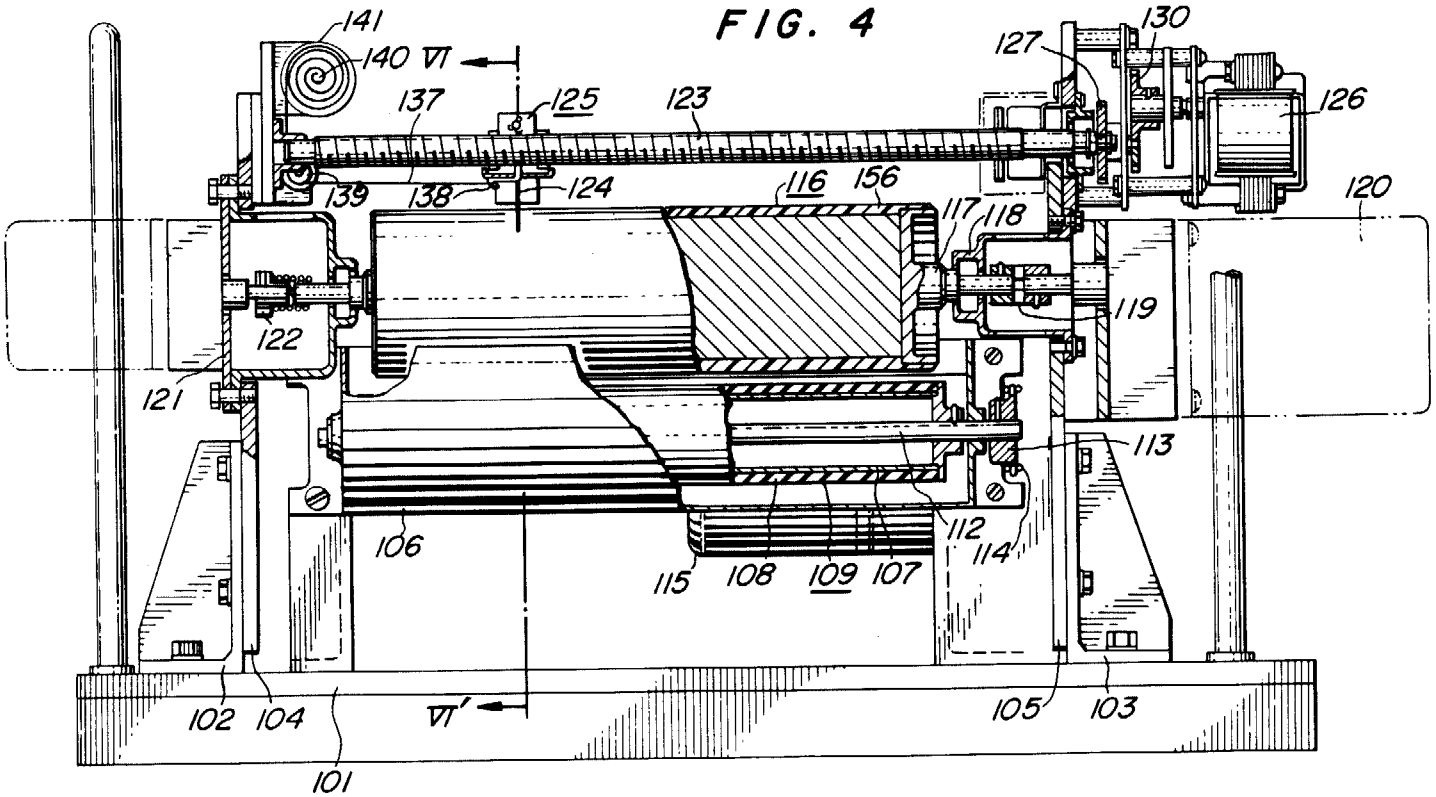
FIG. 4 is a partly vertical sectional front elevational view of an electrostatic recording apparatus embodying the present invention.

In operation, when an information signal is transmitted to the recording stylus 124, the scanner 125 is moved rightwardly from the left in FIG. 4 as the lead screw 123 is rotated so as to make a scanning movement over the insulating resin layer 156 covering the surface of the recording drum 116. Upon completion of the scanning of a record, the scanner 125 is pulled back to its leftward position by the spool 141 mounted on the spool shaft 140 and the rope 137 anchored to the spool 141. At this position of the scanner 125, the holder 155 swings through the angle $\theta$ to urge the recording stylus 124 away from the recording drum 116 by a certain distance. Then, the magnet drum 109 in the toner casing 106 is rotated clockwise or in a direction of the arrow R in FIG. 6 so that the powdery developer 111 attaches to the outer peripheral surface of the magnet drum 109 to constitute a magnet brush and the powdery developer 111 is attached to the latent image portion on the surface of the recording drum 116.

After complete development of the latent image on the surface of the recording drum 116, the recording sheet 150 is fed through the guide roller 148 to be brought into pressure contact with the recording drum 116, and at the same time, the charger 147 applies a charge to the recording sheet 150 so that the toner becomes attached to the surface of the recording drum 116 and is electrostatically transferred onto the recording sheet 150. Subsequently, the recording sheet 150 is stripped off the recording drum 116 by the action of the guide roller 149, and a heater applies heat to the recording sheet 150 to fix the image. Upon completion of the transfer printing, the charge eraser 142 erases the charge carried by the toner and latent image on the surface of the recording drum 116. More precisely, upon completion of the step of transfer printing, a high D.C. or A.C. voltage is applied to the charge eraser 142 with the result that the electrode 143 applies a corona discharge to the recording drum 116 to neutralize or erase the charge on the recording drum 116, thereby completing all the steps for recording.

Figure 9:
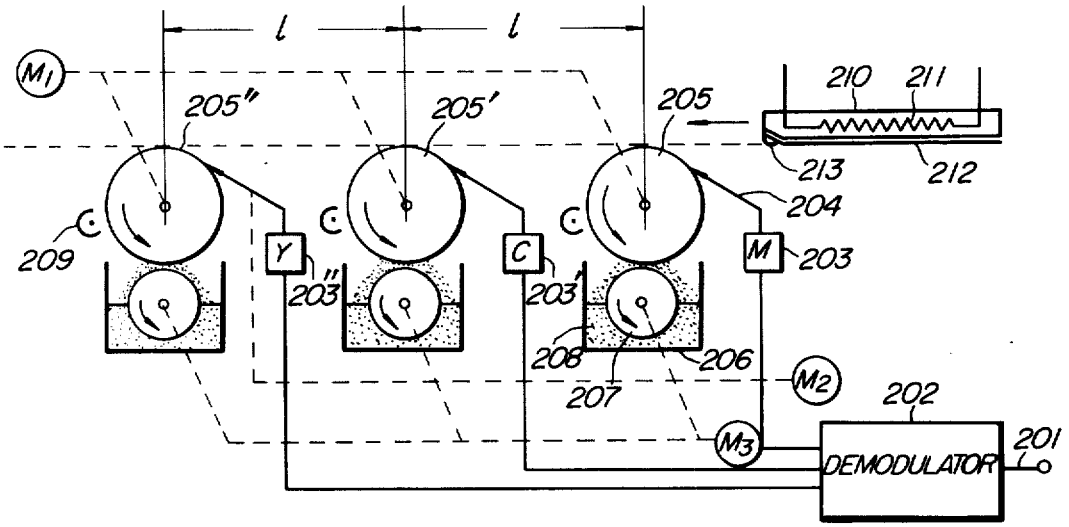
FIG. 9 is a schematic view of a color copying apparatus utilizing the principle of image transfer recording according to the present invention.
Figure 5:
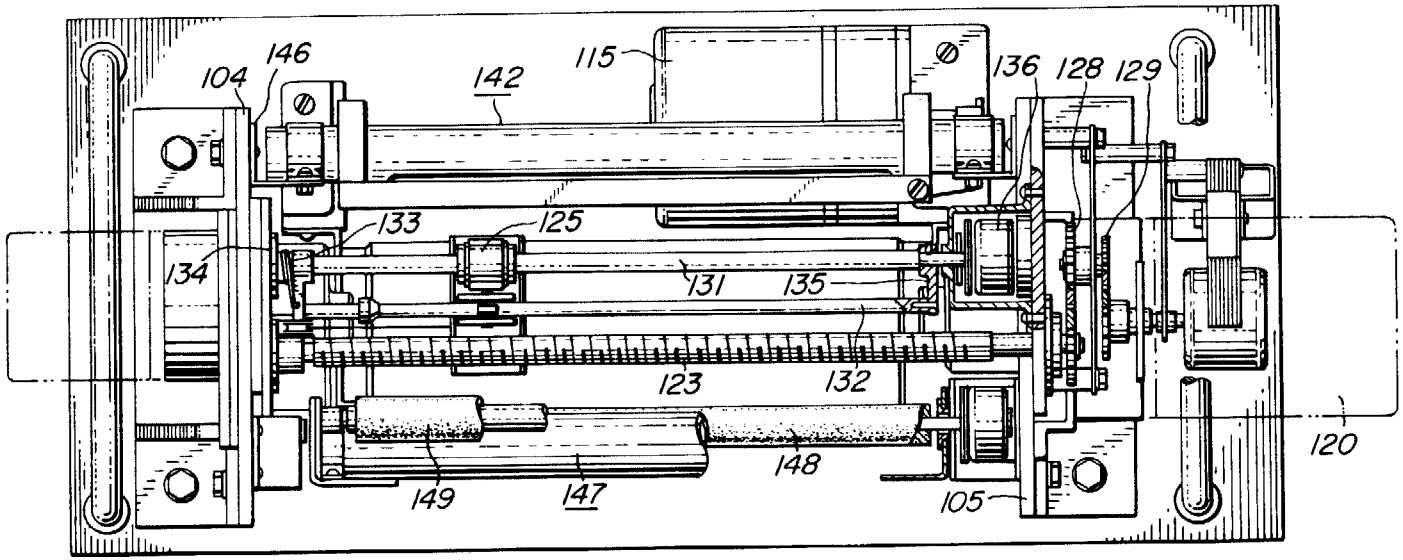
FIG. 5 is a partly cross-sectional plan view of the apparatus.
Figure 6:
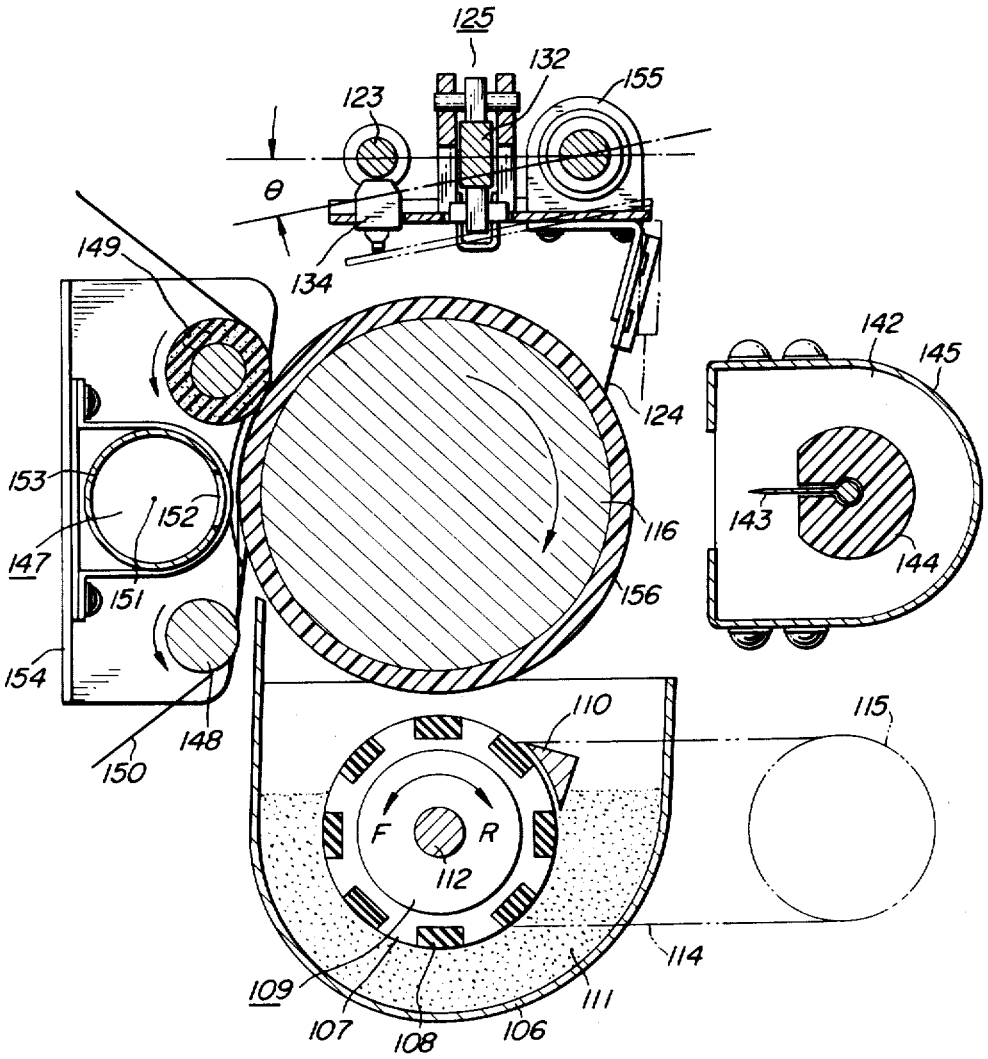
FIG. 6 is an enlarged sectional view taken on the line VI—VI' in FIG. 4.

FIG. 9 A is a schematic view of a color copying apparatus for obtaining a color print by the use of an apparatus as shown in FIGS. 4 through 6.

Referring to FIG. 9, a multiple color signal produced at the transmitting side is transmitted by way of a transmission line 201 to a demodulator 202 where the color signal is demodulated and separated into primary color signals which are then fed to the respective amplifiers 203 for magenta (M), 203' for cyan (C) and 203'' for yellow (Y). An electrostatic recording stylus 204 is adapted to be applied with the voltage of the primary color signal delivered from the amplifier 203. The recording stylus 204 is made from a metal material possessing high flexibility and high resistance to wear and may be tungsten wire, piano wire or the like. The recording stylus 204 has a diameter corresponding to the density of the scanning lines for recording and the diameter is of the order of 80 to 90 $\mu$ when, for example, the scanning line density is about 10 lines per mm.

A recording drum 205 is composed of a drum member of a rust-free metal such as brass, stainless steel or aluminum, and a surface layer of a heat-resistive, non-adhesive, electrically insulating resin of the kind previously described. The thickness of the resin coating on the metal drum lies in the range of about 6 to 7 $\mu$ when it is used with an electrostatic recording sheet. However, in order that the resin coating can endure tens of thousands of recordings, the thickness is preferably slightly larger than the above value and experiments proved that a thickness of 20 to 30 $\mu$ is preferable. In lieu of coating the resin to obtain the resin layer, a sheet of such resin may be bonded to the surface of the metal drum.

The three recording drums 205, 205' and 205'' have the same size and are mounted for fine adjustment so that the center-to-center spacing therebetween can be adjusted to the circumferential length l of the drum 205. The recording styli 204, 204' and 204'' are adjustably mounted so that they can be disposed in symmetrical positions relative to the respective recording drums 205, 205' and 205''. The recording drums 205, 205' and 250'' rotate in the direction of the arrow in FIG. 9 in synchronism with a signal sent from a motor $M_1$. The recording styli 204, 204' and 204'' are movable at a suitable speed in a direction parallel with the axes of the recording drums 205, 205' and 205'', and this is done by a motor $M_2$ and a feed mechanism. A magnet drum 207 for development has the same length as the recording drum 205 and is disposed within a developing tank 206. There are other two similar tanks 206' and 206'' having therewithin respective magnet drums 207' and 207''. The three developing tanks 206, 206' and 206'' contain therein a powdery developer 208 for magenta, a powdery developer 208' for cyan and a powdery developer 208'' for yellow, respectively.

After the recording is done on the recording drums 205, 205' and 205'', a motor $M_3$ causes rotation of the magnet drums 207, 207' and 207'' so as to simultaneously carry out the developing of the three primary colors. It is so devised that, when the developing unit is not in operation, the magnet drum 207 is rotated in the reverse direction so that the cooperating doctor plate scrape the powdery developer 208 off the surface of the magnet drum 207 or the developing unit itself is lowered to a predetermined lower position so that the surface level of the powdery developer 208 contained in the tank 206 is spaced away from the recording drum 205.

A charge eraser 209 is composed of a metal casing having an opening at one side thereof and an electrically insulated wire of very small diameter, of the order of, for exmaple, 0.06 mm. A high A.C. voltage of about 5 and 10 kV is applied to the wire to ionize the ambient air to thereby neutralize the charge carried by the recording drum 205 by means of the ionized ambient air. When it is desired to erase the charge in a short length of time, it is effective to apply a high D.C. voltage of polarity opposite to the polarity of the recording voltage (400 to 700 V peak-to-peak) in lieu of the high A.C. voltage. In the case of the recording signal voltage of about + 500 V peak-to-peak, it was possible to erase the charge to an extent that the charge did not obstruct the next recording by applying a high D.C. voltage of about −5 to −6 kV for about 3 seconds.

A hot plate 210 is provided with a heater 211 and suitable clamping means 213 for clamping a recording sheet 212 in flat relation on the lower surface of the hot plate 210. The recording sheet 212 onto which powder images are transfer printed has a size equal to the surface area of the recording drum 205. An effect similar to the above may be obtained by employing, in lieu of the hot plate 210, a hot roller of the kind previously described to press the recording sheet 212 against each of the recording drums 205, 205' 205'' while heating the sheet 212 so that the sheet 212 makes rolling contact with the powder image on each of the recording drums 205, 205' and 205''. The recording sheet 212 clamped onto the hot plate 210 is heated by the heater 211 to a temperature which is slightly higher than the melting point (commonly about 100° to 120° C.) of the toners electrostatically attracted onto the surface of the recording drums 205, 205' and 205''. The recording sheet 212 carried by the hot plate 210 is moved in a direction of the arrow in FIG. 9 by a parallel feed mechanism (not shown) while successively making rolling contact with the surface of the recording drums 205, 205' and 205''.

In operation, a multiple color signal transmitted to the demodulator 202 by way of the transmission line 201 is separated into primary color signals by the demodulator 202 and the primary color signals are supplied to the respective amplifiers 203, 203' and 203''. The color signals are recorded on the surface of the recording drums 205, 205' and 205'' by combination of the synchronous rotation of the recording drums 205, 205' and 205'' and the axial movement of the recording styli 204, 204' and 204''.

Upon completion of the recording, the developing units 206 – 208, 206' – 208' and 206'' – 208'' are actuated to develop the electrostatic latent images on the recording drums 205, 205' and 205'' with the respective colors. The patterns developed on the recording drums 205, 205' and 205'' are so set that the junction thereof comes to the topmost portion of each of the recording drums 205, 205' and 205''. As the hot plate 210 carrying the recording sheet 212 is advanced in the direction of the arrow while making rolling contact with the recording drum 205, the toner of magenta on the recording drum 205 is fused by the heat and the fused toner is transferred onto the surface of the recording sheet 212 because the recording sheet 212 is more adhesive than the surface of the recording drum 205.

After the toner of magenta on the recording drum 205 is transferred onto the recording sheet 212, the toner of cyan on the next recording drum 205' is transferred under heat onto the recording sheet 212, and similarly the yellow toner on the succeeding recording drum 205'' is transferred under heat onto the recording sheet 212. The color image of magenta transfer printed under heat onto the recording sheet 212 would not be transferred onto the recording drums 205' and 205'' for cyan and yellow because the latter toners are less adhesive than the former toner, and there is completely no fear that intermixing of the toners will take place on the recording drums.

After the step of transfer printing, electrostatic residual charge images remain on the recording drums 205, 205' and 205'' although the toner images on these recording drums have been 100 percent transfer printed onto the recording sheet 212. Therefore, the charge erasers 209, 209' and 209'' utilizing the corona discharge are energized to erase the residual charge images so that the next recording cycle can be immediately started.

The above manner of transfer printing is advantageous in that the color image transfer printed onto the recording sheet 212 has a satisfactory quality owing to the fact that the transfer printing of the toner images and the fixing under heat can be simultaneously effected and the color image is subject to the ferrotype effect because of the flatness and smoothness of the surface of the recording drums 205, 205' and 205''.

The toners employed have commonly a melting point of the order of 100° ± 10°C. Thus, in order to rapidly carry out the transfer printing by heating, it is necessary that the temperature of the recording sheet 212 is higher by about 50° to 100° C. than the melting point of the toners because the heat of the recording sheet 212 is absorbed by each of the recording drums 205, 205' and 205'' and a reduction in the temperature of the recording sheet 212 results.

The resin layer of each of the recording drums 205, 205' and 205'' is required to be sufficiently resistive to heat so that it can withstand such a temperature. However, the metal drum constituting the body of each recording drum 205, 205', 205'' may have a large heat capacity and the resin layer may have a small thickness so as to suppress the temperature rise at the surface of the resin layer to a low value thereby to prevent the fused toners from adhering to the surface of the recording drums.

The recording sheet 212 has commonly a thickness of the order of 60 to 100 $\mu$ and it is desirable that the temperature of the hot plate 210 and the time rate of advancing movement of the hot plate 210 in rolling contact with the recording drum be adjusted depending on the thickness of the recording sheet 212. An experiment was carried out using a recording drum of 24 — 24 stainless steel, a resin layer of tetrafluoroethylene 20 $\mu$ thick, and a recording sheet 60 $\mu$ thick. The experiment proved that the best results can be obtained when the recording drum 205 is rotated at a rate of about 10 to 15 seconds in the case where the temperature of the hot plate was 180° C. and at a rate about 5 to 10 seconds in the case when the temperature of the hot plate was 230°C.

The length of time of the above extent required for the transfer printing under heat does not offer any substantial problem under the conditions for obtaining a color print and thus a great reduction in time can be realized compared with the prior art color printing method which includes repeating the cycle of successively recording, developing and fixing different colors.

While the above description has referred to the case of obtaining a color print of three primary colors, it is preferable to increase the number of colors in order to obtain a print with a better reproduction of colors. Where it is desired to obtain a multi-color print including still more colors, a plurality of units each consisting of the recording drum 205, recording stylus 204, amplifier 203, developing unit 206 – 208 and residual charge eraser 209 may merely be additionally provided.

Further, although the above description has referred to the case in which the recording drums 205, 205' and 205'' are spaced from each other at a distance equal to the circumferential length thereof for the convenience of explanation, these recording drums can be actually disposed very close to each other by arranging them in such a way that the leading end of the recording sheet 212 always registers with the marginal edge of a pattern when making rolling contact with the recording drum. If, for example, a recording sheet with a size of Japanese Industrial Standards, B 5 (182.0 × 257.0 mm) is employed and the scanning direction is along the shorter side of the sheet, the spacing between the three recording drums 205, 205' and 205'' can be reduced to about 180 mm.

The present invention described above is analogous to the xerography technique in which a latent image in the form of an electrical charge is formed on a drum of photoconductive selenium by optical means, and after developing the image with a toner, the toner image is transfer printed onto a recording sheet. However, the drum of photoconductive selenium in xerography is very easily damaged, hence expensive, and requires complex handling, and a drum cleaning means is indispensably required because the toner image still remains on the drum after it has been transfer printed onto a recording sheet. In contrast to xerogrphy, any such cleaning means is not required in the present invention and the recording drum can be easily handled since the resin layer on the surface of the recording drum can be simply provided and is inexpensive. Furthermore, inexpensive plain paper can be used as a recording sheet for obtaining a print of a pattern and a color print can also be obtained with such plain paper.

We claim:

1. An apparatus for recording an image by transfer printing comprising a recording drum composed of a drum member of conductive metal and a layer of resin covering the surface of said drum member, said layer having a breakdown voltage of not less than 1 KV, a volume resistivity of more than $10^{14}\Omega$ cm, a surface resistivity of more than $10^{14}\Omega$ and no pinholes and preventing fused toner from attaching thereto, means for applying information [in the form of a signal voltage] *of the image* to the surface of said recording drum [through a recording electrode thereby] to form a latent image of an electrical charge on the surface of said recording drum, developing means for selectively supplying a powdery developer [through the medium of a magnet drum ] to the latent image [ formed ] *to form a powder image* on *the surface of* said recording drum, heating means for applying heat to a recording sheet, and means for transfer printing the powder image [ that is selectively attached to the latent image portion ] on *the surface of* said recording drum onto the heated recording sheet, and at the same time, fusing the powder to firmly fix *the* same to the recording sheet under heat.

2. An apparatus for recording an image by transfer printing as defined in claim 1, in which said layer of resin is made of polyamide imide.

3. An apparatus for recording an image by transfer printing as defined in claim 1, in which said developing means [ is further characterized by a support, ] *includes* a magnet drum which [ comprised ] *comprises a support and* rubber magnets having the same axial length as the support and being embedded radially in the outer peripheral portion of the support, a sweeping plate being engaged at a portion thereof with the outer surface of [ said ] *the* magnet drum for controlling the amount of the powdery developer [ supply ] *supplied* to [ the ] *said* recording drum, and a drive source for *selectively* rotating the magnet drum in [ either ] *both the* normal [ or ] *and* reverse *directions* [ direction ].

4. An apparatus for recording an image by transfer printing comprising a recording drum composed of a drum member of conductive metal and a layer of resin covering the surface of said drum member, said layer having a breakdown voltage of not less than 1 KV, a volume resistivity of more than $10^{14}$ Ω cm, a surface resistivity of more than $10^{14}$ [ $10\bar{6}$ ] Ω and no pinholes and preventing fused toner from attaching thereto, means for applying information [ in the form of a signal voltage ] *of said image* to the surface of said recording drum [ through a recording electrode thereby ] to form a latent image of an electrical charge on the surface of said recording drum, developing means for selectively supplying a powdery developer [ through the medium of a magnet drum ] to the latent image [ formed ] *to form a powder image* on *the surface of* said recording drum, electrostatic charging means disposed adjacent to the back face of a recording sheet in contact with the [ powdery developer selectively attached to the latent image ] *powder image to be transfer printed*, and residual charge erasing means disposed opposite to said recording drum for removing the [ electrostatic force ] *electric charge* remaining on the surface of said recording drum after the powder image on *the surface of* said recording drum has been transfer printed onto the recording sheet so as to make it possible for the following information *of an image* to be applied to *the surface of* said recording drum without cleaning the [ powder image ] *powdery developer* remaining on the surface of [ the ] said recording drum [ after the recording sheet transfer printed ].

5. An apparatus for recording an image by transfer printing as defined in claim 4, in which said layer of resin is made of polyamide imide.

6. An apparatus for recording an image by transfer printing as defined in claim 4, in which said developing means includes [ a support, ] a magnetic drum which comprises *a support and* rubber magnets having the same axial length as the support and being embedded radially in the outer peripheral portion of the support, a sweeping plate being engaged at a portion thereof with the outer surface of [ said ] *the* magnet drum for controlling the amount of the powdery developer [ supply ] *supplied* to [ the ] *said* recording drum, and a drive source for *selectively* rotating the magnet drum in [ either ] *both the* normal [ or ] *and* reverse [ direction ] *directions*.

7. An apparatus for recording an image by transfer printing comprising a plurality of sets each [ consisting of ] *including* a recording drum having a layer of resin covered [ in ] *on* the surface thereof, said layer having a breakdown voltage of not less than 1KV, a volume resistivity of more than $10^{14}$ [ 106 ] Ω cm, a surface resistivity of more than $10^{14}$Ω and no pinholes and preventing fused toner from attaching thereto, means for recording information *of the image* on the surface of said recording drum [ through the medium of electrostatic recording means thereby to form ] *in the form of* a latent image *of an electrical charge* on the surface of said recording drum, and means for developing the latent image, said sets being arranged side by side equal and corresponding to the number of required primary colors *of the image*, [ and demodulator ] means for separating a multiple color signal *of the image* into the respective primary color signals so that the primary color signals are *simultaneously* recorded on the *respective* [ surface ] *surfaces* of said recording drums by said *respective* recording means and then developed by said *respective* developing means and [ a recording sheet is successively brought ] *means for successively bringing a recording sheet* into contact with the *respective* [ surface ] *surfaces* of said recording drums for the transfer printing of the [ color ] *developed* images onto the recording sheet.

8. An apparatus for recording an image by transfer printing as defined in claim 7, in which said layer of resin which covers each surface of said plurality of recording drums arranged side by side equal and corresponding to the number of required primary colors is made of polyamide imide.

9. An apparatus for recording an image by transfer printing comprising means for forming a latent image on a layer of resin and at a location opposite to the surface of a recording drum driven by an electric motor, said layer covering the surface of the recording drum and having a breakdown voltage not less than 1 KV, a volume resistivity of more than $10^{14}$Ω cm, a surface resistivity of more than $10^{14}$Ω and no pinholes and preventing fused toner from attaching thereto, developing means for selectively supplying a powdery developer to the latent image formed on *the surface of* the recording drum, means for transfer printing the developed image formed by the *powdery* developer selectively attached to the latent image onto a recording sheet contacting [ said ] *the* recording drum, and residual charge erasing means disposed opposite to [ said ] *the* recording drum for removing the electric charge remaining on [ said ] *the* recording drum without cleaning the surface of [ said ] *the* recording drum after the developed image has been transfer printed onto the recording sheet, in which said means for forming a latent image comprises a holder which is mounted on a slide rod so as to be movable in the axial direction of the recording drum and a recording [ stulus ] *stylus* which is mounted on the holder and one end of which contacts the surface of the recording drum only in the case of a signal voltage being applied, said developing means comprises a magnet drum which is housed in a casing and is mounted so as to be *selectively* rotatable in [ either ] *both the* normal [ or ] *and* reverse *direc-*

*tions* [ direction ] , a powdery developer which is supplied to the recording drum by the magnet drum only in the case of the latent image being developed and a sweeping plate which is engaged at a portion thereof with the outer surface of the magnet drum for controlling the amount of the powdery developer [ supply ] *supplied* to the recording drum in response to the rotating direction of the magnet drum, said means for transfer printing comprises [ a recording sheet which is brought into contact with the recording drum by ] a guide roller *which brings the recording sheet into contact with the recording drum* and a charging means disposed on the back side of the recording sheet, and said residual charge erasing means comprises an electrode which is covered by a cover and one end of which is opposed to the recording drum *and the other end of which is supported by the cover* through an insulator.

* * * * *